(12) United States Patent
Perkins (10) Patent No.: US 7,040,178 B1
(45) Date of Patent: May 9, 2006

(54) LOAD CELL PROTECTION APPARATUS AND LOAD DETECTION APPARATUS INCORPORATING SAME

(75) Inventor: John T. Perkins, Pittstown, NJ (US)

(73) Assignee: Ingersoll Rand Company, Montvale, NJ (US)

( * ) Notice: Subject to any disclaimer, the term of this patent is extended or adjusted under 35 U.S.C. 154(b) by 0 days.

(21) Appl. No.: 10/993,979

(22) Filed: Nov. 19, 2004

(51) Int. Cl.
*G01N 3/02* (2006.01)
(52) U.S. Cl. .......................................... 73/856
(58) Field of Classification Search ............... None
See application file for complete search history.

(56) References Cited

U.S. PATENT DOCUMENTS

| | | | | |
|---|---|---|---|---|
| 4,196,784 | A | * 4/1980 | Suzuki et al. ............... | 177/211 |
| 4,254,841 | A | 3/1981 | Loskill | |
| 4,361,199 | A | * 11/1982 | Ulicny ....................... | 177/154 |
| 4,467,661 | A | 8/1984 | Somal | |
| 5,052,505 | A | 10/1991 | Naito et al. | |
| 5,186,061 | A | 2/1993 | Montalvo, III et al. | |
| 5,777,240 | A | * 7/1998 | Lefebvre et al. ....... | 73/862.634 |
| 6,354,159 | B1 | * 3/2002 | Burkhard et al. ....... | 73/862.637 |
| 6,501,032 | B1 | * 12/2002 | Luchinger et al. .......... | 177/184 |
| 6,684,487 | B1 | 2/2004 | Naito et al. | |
| 6,766,701 | B1 | 7/2004 | Norling et al. | |

OTHER PUBLICATIONS

"SPA Series", Internet web page for ACells: Single Point Load Cells—SPA Series, undated, 2 pages.
"SSB Series", Internet web page for ACells: Single-Ended Shear Beams—SSB Series, undated, 2 pages.

* cited by examiner

*Primary Examiner*—M. Noori
*Assistant Examiner*—Octavia Davis
(74) *Attorney, Agent, or Firm*—Michael Best & Friedrich LLP (57) ABSTRACT

A protection apparatus for a load cell having a constrained end portion and a movable end portion and a load detection apparatus incorporating the same are provided. The protection apparatus includes a housing having a longitudinal axis with a first end and a second end, a pivot disposed through the housing and located in a plane perpendicular to the longitudinal axis of the housing, and a sensor mount pivotally disposed on the pivot. The protection apparatus through its pivot transfers away from the load cell forces that are not aligned with a direction in which the load cell operates. The sensor mount has a first end and a second end, the first end of the sensor mount is disposed in the first end of the housing between a first position and a second position defined by the housing. The second end is configured for attachment to the movable end portion of the load cell. At least one spring is disposed in the second end of the housing for constraining the constrained end portion of the load cell.

24 Claims, 9 Drawing Sheets

LOAD CELL PROTECTION APPARATUS AND LOAD DETECTION APPARATUS INCORPORATING SAME

BACKGROUND

This invention relates in general to protection apparatus for protecting a load cell from physical damage and from loading beyond a predetermined range.

Load cells are known in the art and used to convert sensed mechanical forces into electrical signals. Such load cells usually include a cantilevered structural member which, when loaded with a force or weight, deforms or deflects. The deflection or deformation is then measured by a strain gage placed on the structural member. The satisfactory operability of such a load cell is limited by the magnitude of deflection or deformation the structural member can withstand from applied loads, as well as the ability of the sensing device to tolerate the deformation or deflection regardless of the direction in which such loads are applied. Thus, an unprotected load cell, when overloaded, will be damaged.

The foregoing illustrates limitations known to exist with respect to load cells. Thus it is apparent that it would be advantageous to provide an alternative directed to overcoming one or more of the limitations set forth above. Accordingly a load cell protection apparatus is provided including the features more fully disclosed hereinafter.

SUMMARY OF THE INVENTION

According to the present invention, a protection apparatus for a load cell having a constrained end portion and a movable end portion and a load detection apparatus incorporating the same are provided. The protection apparatus includes a housing having a longitudinal axis with a first end and a second end, a pivot disposed through the housing and located in a plane perpendicular to the longitudinal axis of the housing, and a sensor mount pivotally disposed on the pivot. The sensor mount has a first end and a second end, the first end of the sensor mount is disposed in the first end of the housing and movable between a first position and a second position defined by the housing. The second end is configured for attachment of the load cell and the pivot. At least one spring is disposed in the second end of the housing for constraining the constrained end portion of the load cell.

The foregoing and other aspects will become apparent from the following detailed description of the invention when considered in conjunction with accompanying drawing figures.

DETAILED DESCRIPTION OF THE PREFERRED EMBODIMENTS

The invention is best understood by reference to the accompanying drawings in which like reference numbers refer to like parts. It is emphasized that, according to common practice, the various dimensions of the components as shown in the drawings are not to scale and have been enlarged for clarity. As used herein, the term "spring" means a component or device that stores energy as it deflects under an applied force and releases the stored energy as it returns to its original position when the applied force is removed.

Figure 1:
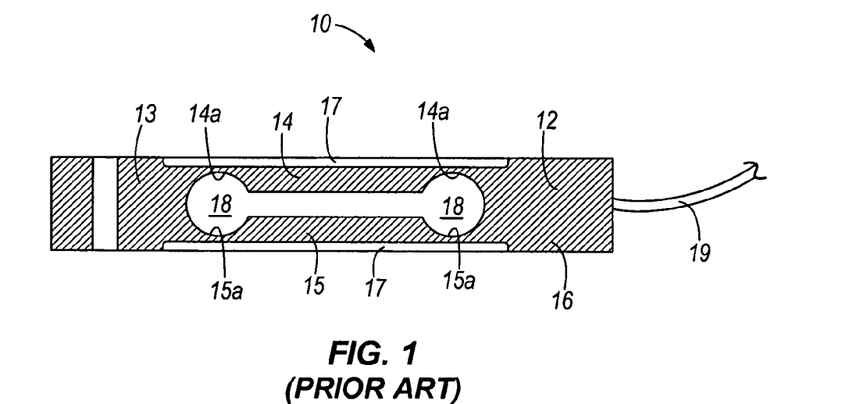
FIG. 1 is cross-sectional view of a conventional bending beam load cell.

A load cell is a transducer that converts a load acting on it into an analog electrical signal and include those of the bending beam type, such as the load cell 10 illustrated in FIG. 1. Exemplary load cells in this regard include single point load cells that are commercially available from many manufacturers with an example being the SPA Series load cells from AmCells Corporation, Vista, Calif. This load cell generally includes a strain generating body 16 that is formed in a hollow rectangular shape by upper and lower beam portions 14, 15 having a constrained end portion 12, a movable end portion 13 and strain generated portions 14a and 15a having small thickness. Each of the beam portions is provided with through circular holes 18 to provide semicircular fillets that more accurately define the flexing of the strain generated portions 14a and 15a.

Strain gauges 17 are adhered to outer surfaces adjacent to the strain generated portions 14a and 15a of strain generating body 16 for measuring the stresses induced in the sensing beam representative of a force applied to the movable end portion. As shown, if an upward load is applied to the movable end portion 13, it is displaced upward relative to the constrained end portion 12 causing compressive and tensile stresses to be exerted on each of the strain generated portion 14a and 15a, respectively. The load is then measured by detecting the strain that occurred by reading the strain gauges 17 using electrical monitoring circuitry (not shown) connected to load cell 10 via electrical cord 19.

Figure 2:
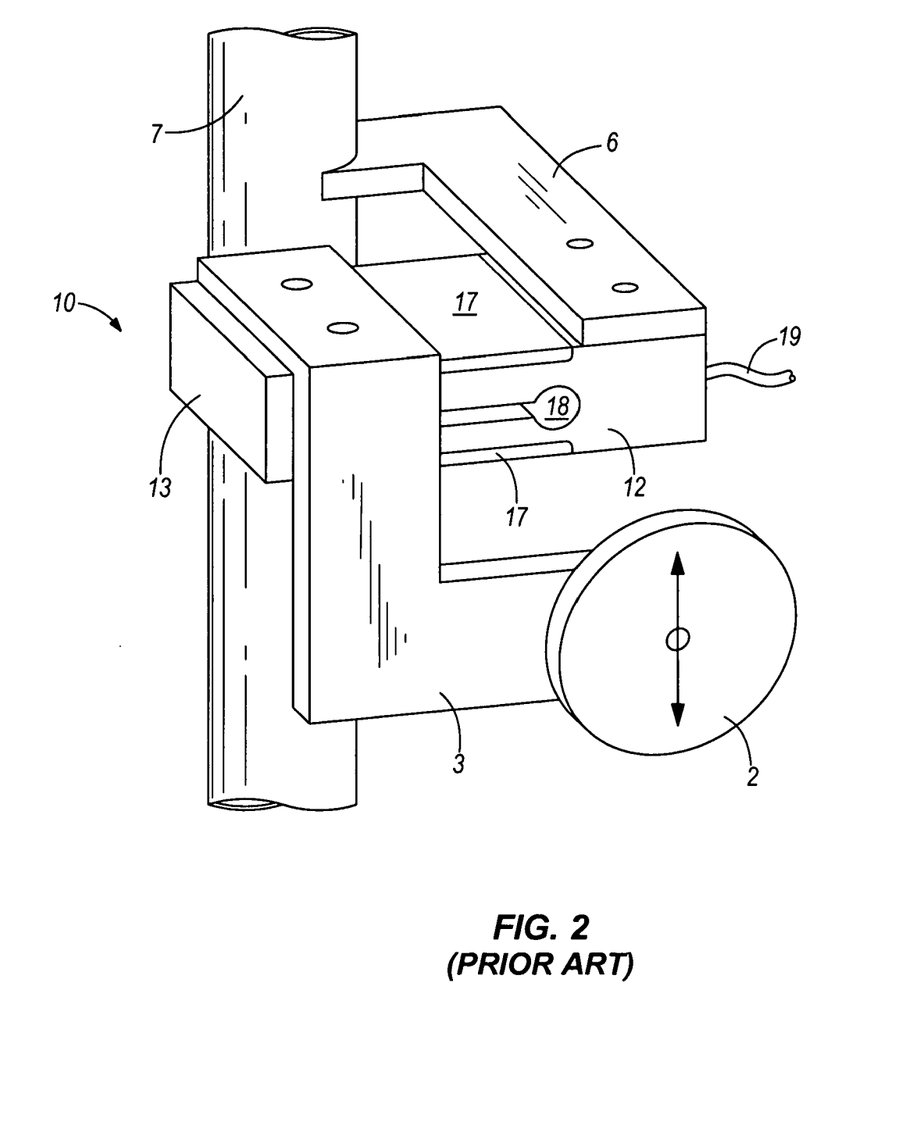
FIG. 2 is a perspective view of a conventional load cell mounting used in conjunction with a handle portion of an end effector of a conventional lift assist device.

Typically load cell 10 is used to measure force applied or as a control input for the operation of mechanisms such as lift assist devices. With respect to the latter, shown in FIG. 2 is a load cell 10 used in conjunction with a handle portion 2 of an end effector of a conventional lift assist device. The movable end portion 13 of the load cell is attached to handle portion 2 via a mounting bracket 3 and the constrained end portion 12 is attached to an end effector frame 7 via a mounting bracket 6. During operation, by exerting an upward or downward force on handle portion 2, as shown by the directional arrows thereon, an electrical signal is provided from the load cell 10 to an electronic control system (not shown) that moves frame 7 up or down simply by pushing the handle portion in that direction. A preferred electronic control system is available as the INTELIFT® Electronic Control System from Ingersoll-Rand Company, Woodcliff Lake, N.J.

For such applications, the load cell is generally sized proportionally to the signal to be detected or the intended range of operation. However, the upper range of the selected load cell can be exceeded from a human input or incidental contact with external objects, especially in the case when the load cell is calibrated to detect small incremental loads.

Figure 10:
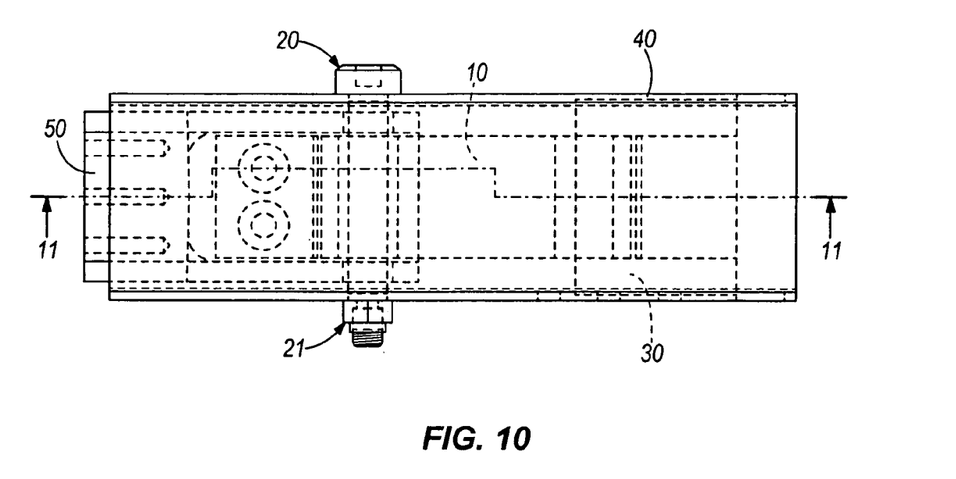
FIG. 10 is a top view showing in phantom the assembled relationship between the load cell and the load cell protection apparatus according to the present invention.
Figure 11:
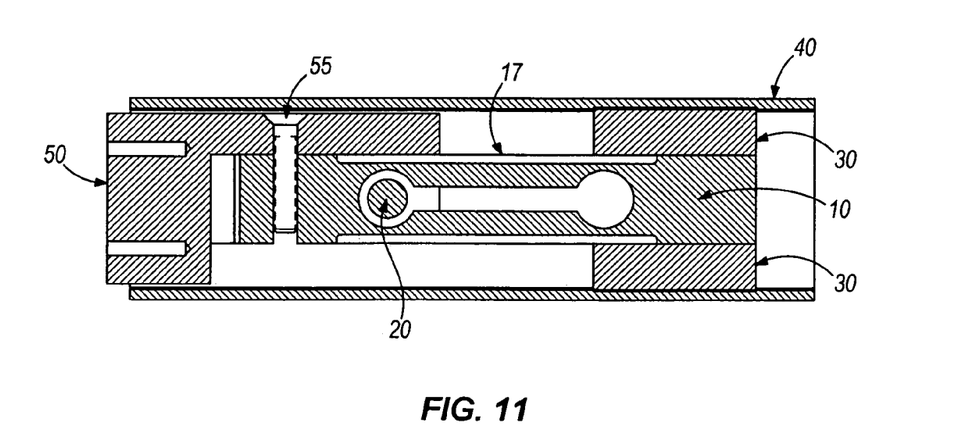
FIG. 11 is a sectional view taken along line 11—11 of FIG. 10.

Referring now to the drawings, shown in FIGS. 3 to 13 is a load cell protection apparatus of the present invention having a load cell that is mounted in a pivoting arrangement instead of in a conventional cantilever arrangement. The load cell protection apparatus of the present invention does not interfere with the normal operation of the load cell and is directly mounted on the load cell in order to protect the load cell both from physical damage and from loading beyond a predetermined range. The load cell protection apparatus through its pivot transfers away from the load cell forces that are not aligned with the direction of operation of the load cell, such as twisting and lateral moments that could otherwise cause erroneous signals and/or damage to the load cell. The assembled relationship between the load cell and the protection apparatus is shown in FIGS. 10 and 11 where the load cell and the protection device are removed from a lifting device. The operating details of the load cell protection apparatus are illustrated more particularly in FIGS. 12 and 13 and will be hereinafter described.

Figure 4:
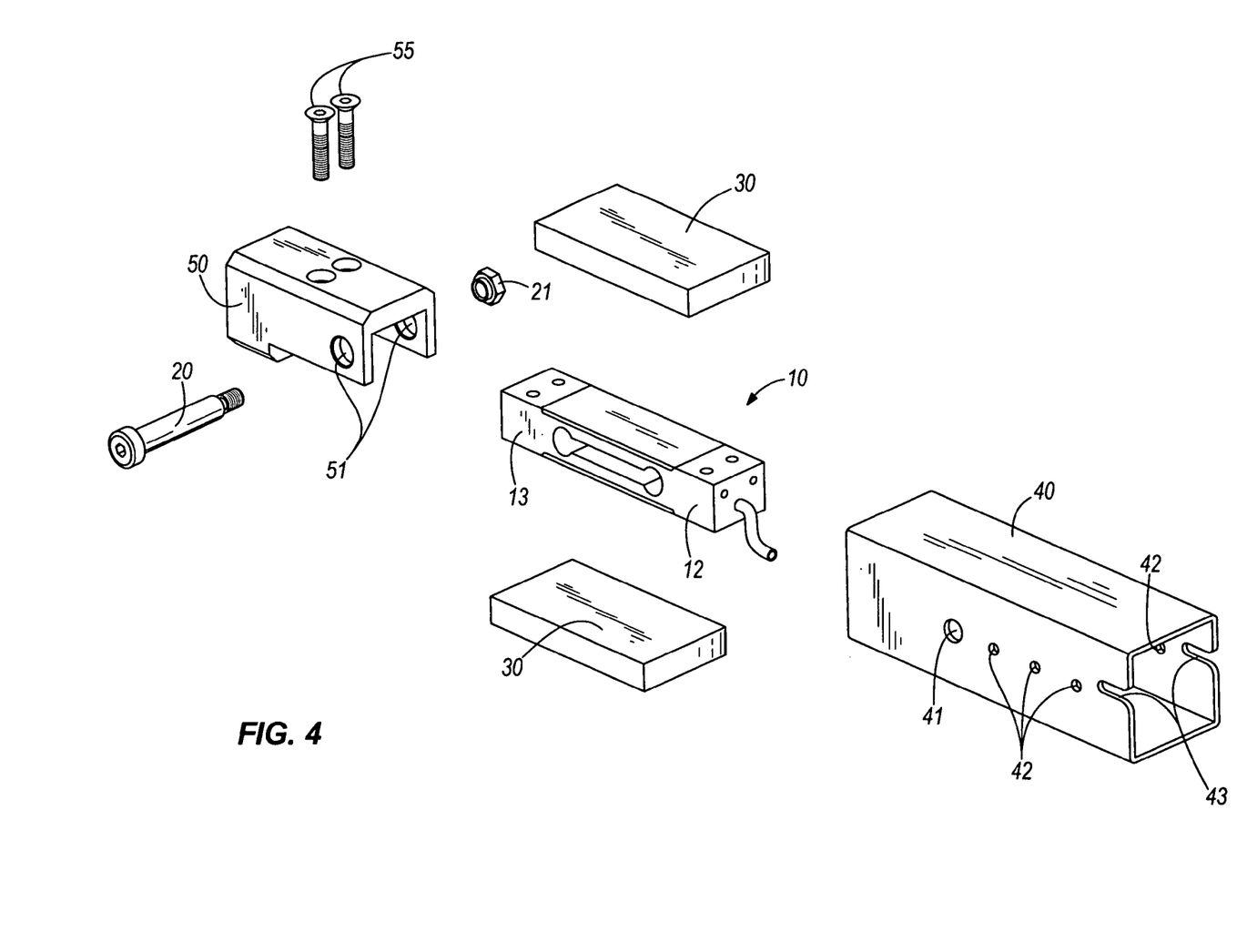
FIG. 4 is an exploded view of the load cell protection apparatus according to the present invention.
Figure 5:
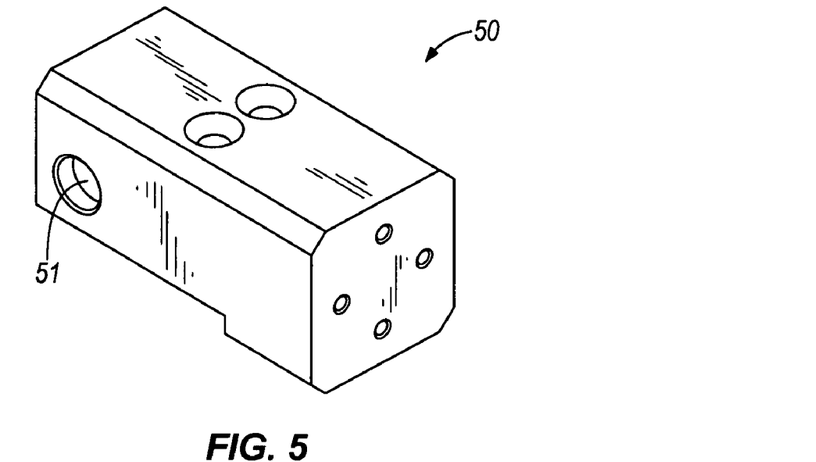
FIG. 5 is a perspective view of a sensor mount used in the embodiment of FIGS. 3,10, and 11.
Figure 6:
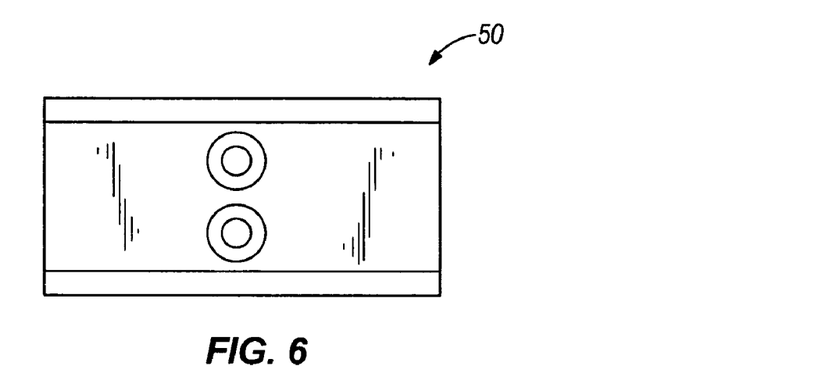
FIG. 6 is a top view of the sensor mount of FIG. 5.
Figure 7:
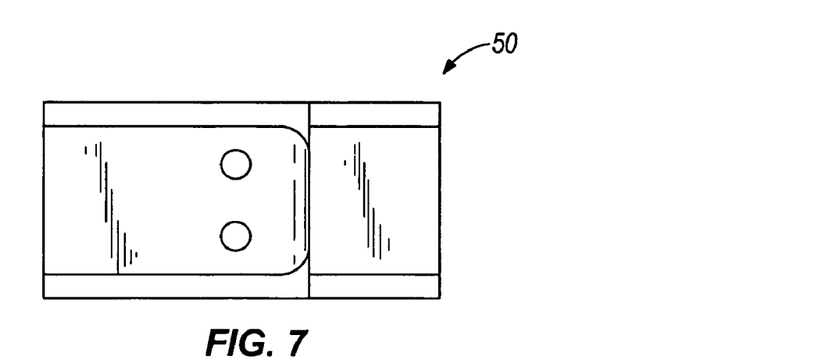
FIG. 7 is a bottom view of the sensor mount of FIG. 5.
Figure 8:
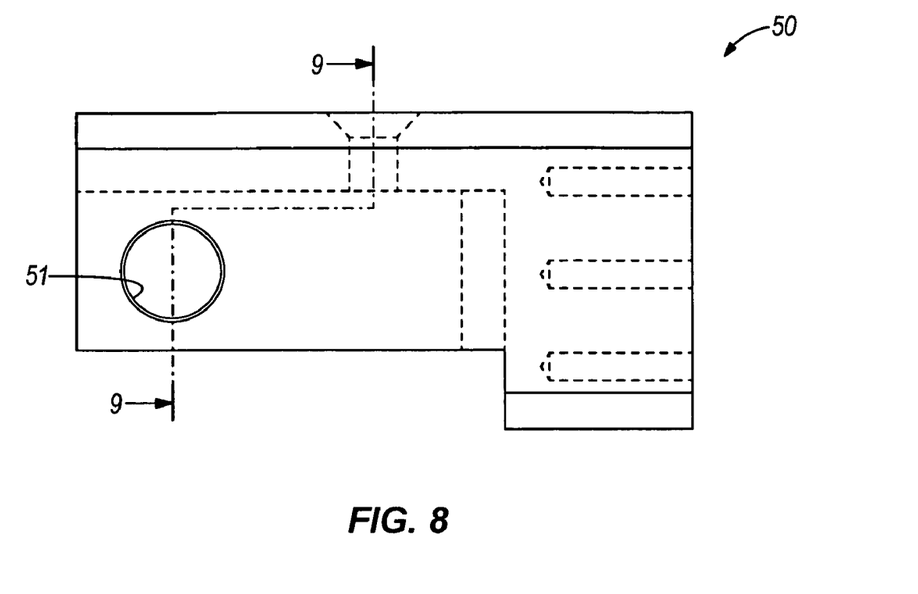
FIG. 8 is a side view of the sensor mount of FIG. 5.
Figure 9:
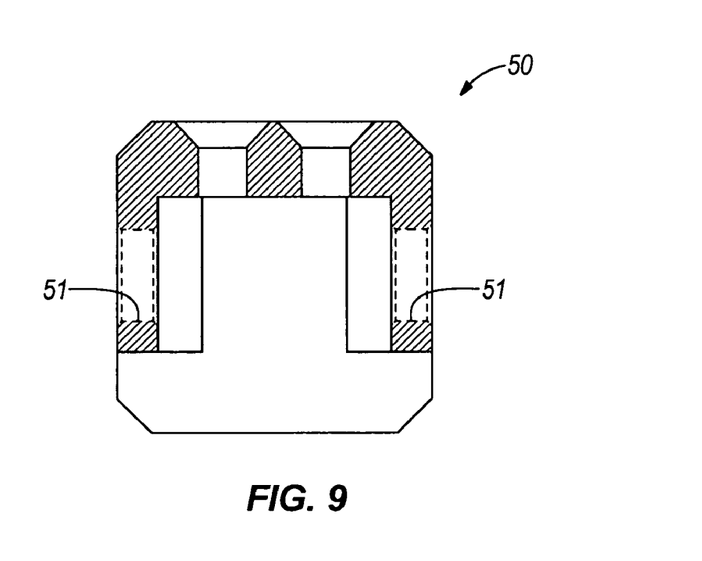
FIG. 9 is a sectional view taken along line 9—9 of FIG. 8.

Shown in FIG. 4 is an exploded view of a protection apparatus for a load cell having a constrained end portion 12 and a movable end portion 13. The protection apparatus according to the present invention includes a housing 40 having a longitudinal axis with a first end and a second end and opposing apertures 41 located in the sides of the housing. Cord slots 43 may also be provided to accommodate the electrical cord 19 of load cell 10 in different mounting positions. A pivot 20 is disposed through apertures 41 and located in a plane perpendicular to the longitudinal axis of the housing with a sensor mount 50 pivotally mounted on the pivot 20 as described below. As shown in FIG. 11, the pivot is provided such that it intersects the longitudinal axis of the housing and is therefor symmetrically located between the top and the bottom of the housing. The pivot may also be offset from the longitudinal axis of the housing, however, as will be described in further detail below with respect to FIG. 13.

Shown in the various views of FIGS. 5–9, the sensor mount 50 is provided having a first end and a second end and apertures 51 which align with apertures 41 of housing 40 and through which pivot 20 is inserted and secured. To facilitate securing pivot 20 in the housing, one end of pivot 20 may be provided with a bolt head with the other end being threaded and secured by a nut 21 as shown in FIG. 10. Other securing devices known in the art, such as cotter pins, may also be used for this purpose. The outer cross sectional dimensions of the sensor mount 50 are configured to fit within and is slightly smaller than the inner cross sectional dimensions of the housing as shown. This permits the first end of the sensor mount 50 to be movable in the first end of the housing 40 between a first position and a second position defined by the housing 40. As shown in the figures, the first position and the second position correspond, respectively, to a topmost and a bottommost position defined by the housing 40 in the operating orientation shown. However, it is to be understood that the first and second positions are not to be limited to any specific directional orientation but designate the endpoints of the operating range of motion of the first end of the sensor mount as limited by the housing, regardless of the mounting orientation of the housing. The operating direction of motion of the first end of the sensor mount is also the direction in which the load cell operates. The second end of sensor mount 50 is configured for attachment to the movable end portion 13 of the load cell 10 for which fasteners such as bolts 55 may be used to attach these components.

As shown in FIG. 11 one of the circular holes 18 of the load cell 10 provides an aperture having a diameter through which at least a portion of the pivot 20 may be disposed. The portion of the pivot 20 disposed in the aperture of the load cell is provided with an outer diameter that is smaller than the diameter of the aperture. The portions of pivot 20 disposed in apertures 41 of housing 40 and apertures 51 of sensor mount 50 are provided with outer diameters that permit rotational contact with the pivot 20. The contact between the pivot 20 and apertures 41 and 51 provides a mechanical pathway that transfers away from the load cell forces that are not aligned with the direction in which the load cell operates.

At least one spring 30 is disposed in the second end of the housing for constraining the constrained end portion 12 of the load cell 10. As shown in FIGS. 4 and 11, the at least one spring 30 can comprise two springs, one spring being located between a top surface of the load cell 10 and the housing 40 and the other spring being located between a bottom surface of the load cell 10 and the housing 40. However, it is contemplated that a single spring having the desired spring constant in tension and compression may also be utilized. The springs are configured to constrain the constrained end of the load cell within any desired operating range by selecting the appropriate spring constant as described in detail below.

Figure 12:
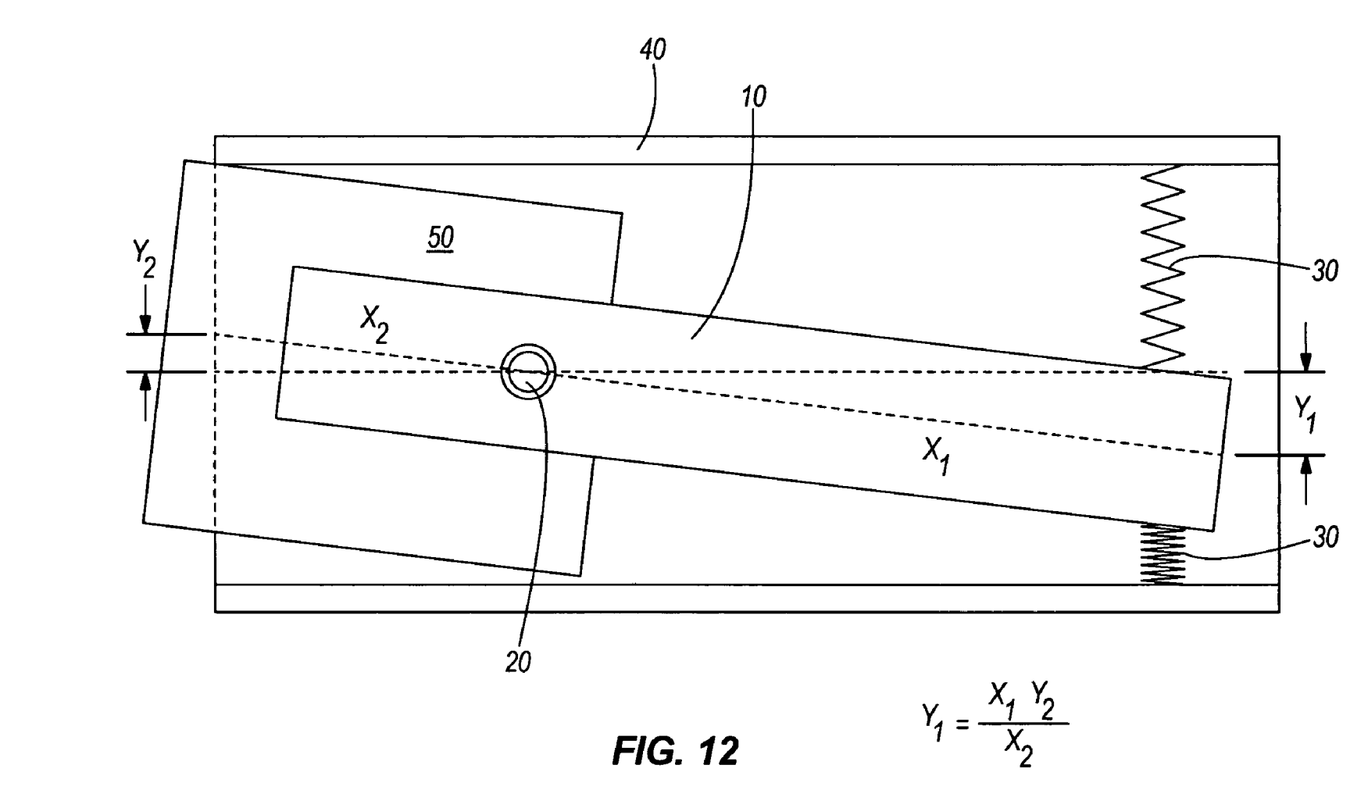
FIG. 12 is a schematic representation of components of the embodiment of FIGS. 3,10, and 11.

Shown in FIG. 12 is a schematic illustration of the load protection apparatus of FIG. 11 in which sensor mount 50 is moved into its first position within housing 40 with the maximum vertical displacement labeled "Y2" corresponding to the displacement of the pivot block 50. Because the distances labeled "X1" and "X2" on either side of the pivot are known, the corresponding maximum deflection "Y1" of the constrained end portion 12 may be calculated as:

$$Y1=(X1\cdot Y2)/X2$$

Because the maximum load that load cell 10 encounters occurs at its maximum deflection, i.e., Y1, springs 30 may be selected to provide a deflection rate that exert spring forces on the constrained end portion 12 within any desired working range. The load cell protection apparatus therefore limits the travel of the movable end portion 13 on one side of a pivot 20 and incorporates springs 30 to apply force to the constrained end portion 12 of the load cell 10 on the other side of the pivot. In this fashion, the selected spring rate of springs 30 prevent the application of loads that are in excess of the desired working range of the load cell up to the point where overtravel restraint of the movable end portion 13 of the load cell occurs by the sensor mount 50 contact against the housing 40. Thus, in addition to protecting a load cell against overload, the load protection apparatus also permits the limiting of the working load range the load cell is subjected to so that it is maintained within its calibrated or other desired range. By controlling the relationship between the distances X1, X2 and the spring rate, very precise calibration can be achieved with standard commercially available load cells.

A spring calibration calculation will now be described. By inverting Hooke's Law, the spring constant k is found by dividing the desired force "F" when deformed by its maximum deflection "Y1". Thus, if Y1=0.07 inches and the desired working load range for the sensor to be used is F=30 lbs., a spring having a constant k=F/Y1=428.6 lbs./in. should be selected using available engineering spring constant tables, as is known in the art. For the given example, in selecting the spring material to be incorporated, an elastomeric material may be utilized. An exemplary material in this regard, which provides the required spring constant, is a foam rubber copolymer such as neoprene/vinyl/nitrile that is commercially available from the McMaster Carr Corporation, Chicago Ill. Using this material, to provide desired force of 30 lbs., two spring blocks each having a thickness of 0.5 inches are then incorporated into the apparatus.

Although both a specific material and its dimensional configurations are given above to illustrate the selection process of the springs described above, it will be readily recognized by those skilled in the art that any spring configuration and/or spring material that will provide the desired spring constant may be substituted.

Figure 3:
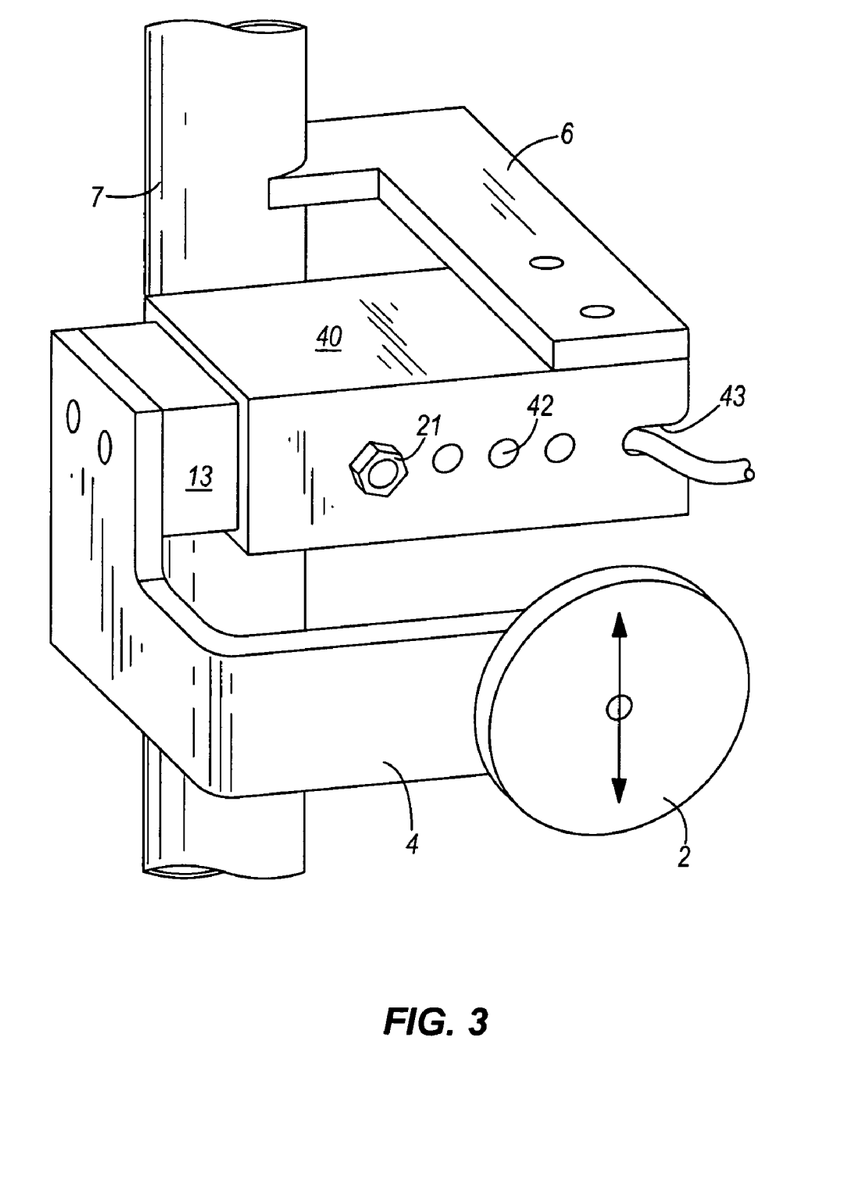
FIG. 3 is a perspective view of a load cell mounting used in conjunction with a handle portion of a lift assist end effector having the load cell protection apparatus according to the present invention.

The protection apparatus according to the present invention may be used to protect load cells used in various load detection applications with mounting holes 42 being preferably provided in housing 40 to facilitate mounting of the load cell protection device in different orientations and positions. Such load detection applications include, but are not limited to, load cells used in conjunction with a handle portion 2 of an end effector of a conventional lift assist device as shown in FIG. 3. The movable end portion 13 of the load cell is attached to handle portion 2 via a mounting bracket 4 and the housing 40 is attached to an end effector frame 7 via a mounting bracket 6. During operation, by exerting an upward or downward force on handle portion 2, as shown by the directional arrows thereon, an electrical signal is provided to an electronic control system (not shown) that moves frame 7 up or down simply by pushing the handle portion in that direction.

Although described above with respect to use with load detection devices for lift assist devices, it is contemplated that the load cell protection apparatus according to the present invention may be incorporated into other devices having load cells in which protection against physical damage and from loading beyond a predetermined working range of the load cell is desired. Furthermore, although shown and described above as being used in conjunction with a bending beam type load cell, the load cell protection apparatus of the present invention is useful in protecting a variety of other load cells of any suitable type having sensors which translate the force or load received by the load cell into a signal that can be detected. Other exemplary load cells include, but are not limited to, shear beam load cells. Moreover, the invention is not limited to use with the load cells shown in FIG. 1 that have circular holes 18 to provide an aperture through which the pivot 20 is disposed.

Figure 13:
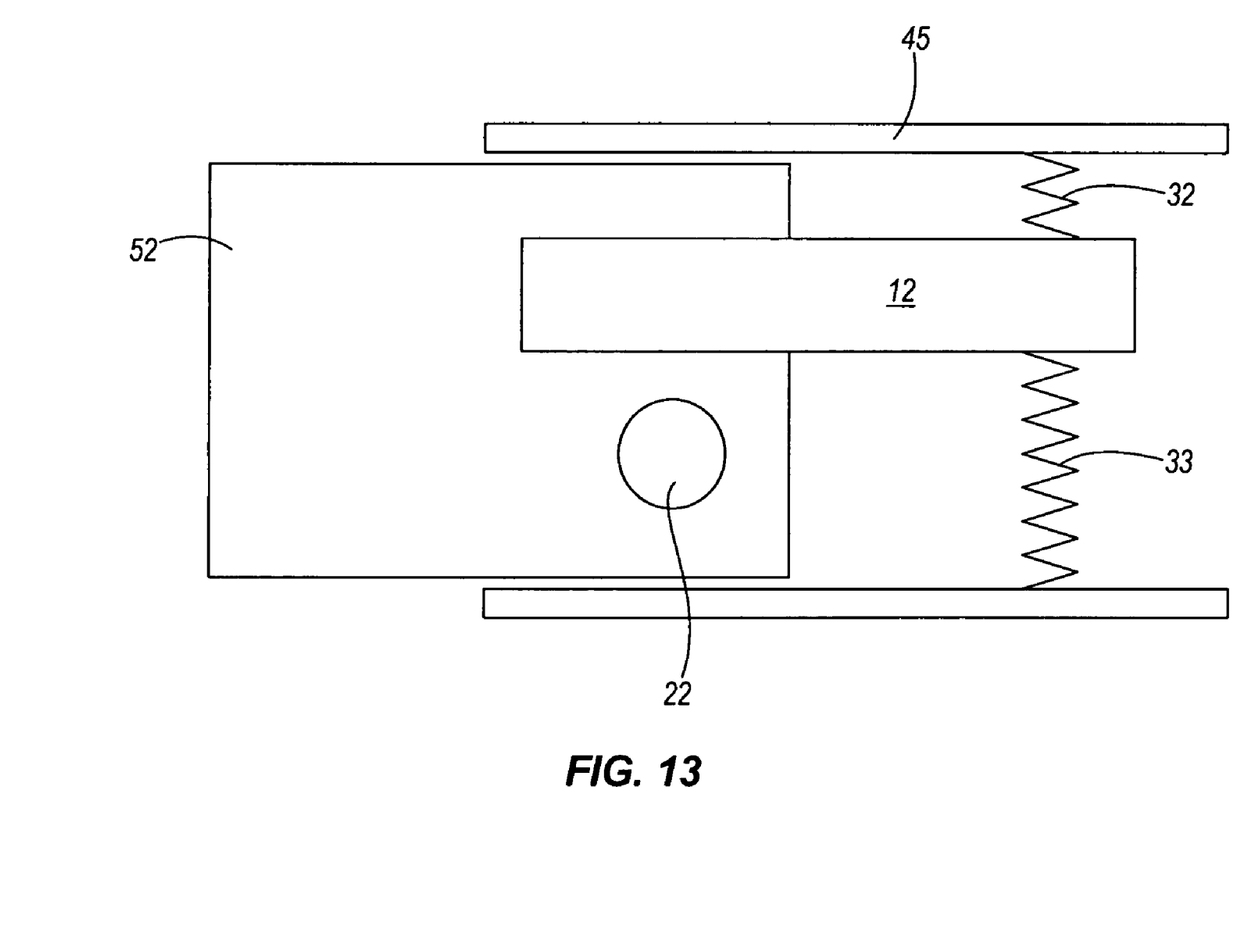
FIG. 13 is a schematic representation of components of an alternate embodiment of the present invention.

An alternative form of the load cell protection apparatus of the present invention is illustrated schematically in FIG. 13 having a pivot 22 that is offset from the longitudinal axis of a housing 45. This configuration may be used in conjunction with any variety of load cells 12, including load cells 10 described above. Load cells 12 are secured to a sensor mount 52 and operated in similar fashion as described in detail above except, due to the offset configuration, springs 32, 33 are selected to provide different constants to give the desired constraint range of the constrained end portion of the sensor 12. As will be readily recognized by those skilled in the art upon reading the teachings of this disclosure, the spring constants for springs 32, 33 may be calculated in similar fashion to the spring constant calculated for springs 30 described in detail above.

While embodiments and applications of this invention have been shown and described, it will be apparent to those skilled in the art that many more modifications are possible without departing from the inventive concepts herein described. It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A protection apparatus for a load cell having a constrained end portion and a movable end portion, the protection apparatus comprising:
    a housing having a longitudinal axis with a first end and a second end;
    a pivot disposed through the housing and located in a plane perpendicular to the longitudinal axis of the housing;
    a sensor mount pivotally disposed on the pivot and having a first end and a second end,
        the first end of the sensor mount being disposed in the first end of the housing and movable between a first position and a second position defined by the housing, and
        the second end being configured for attachment to the movable end portion of the load cell; and
    at least one spring disposed in the second end of the housing for constraining the constrained end portion of the load cell.

2. The protection apparatus according to claim 1 wherein the pivot is offset from the longitudinal axis of the housing.

3. The protection apparatus according to claim 1 wherein the pivot intersects the longitudinal axis of the housing.

4. The protection apparatus according to claim 1 wherein the pivot transfers away from the load cell forces that are not aligned with a direction in which the load cell operates.

5. The protection apparatus according to claim 1 wherein the pivot is disposed through and contacts apertures located in the housing and sensor mount.

6. The protection apparatus according to claim 1 wherein the load detection apparatus further comprises a handle portion of an end effector for a lift assist device.

7. The protection apparatus according to claim 1 wherein the at least one spring comprises an elastomeric material.

8. The protection apparatus according to claim 7 wherein the elastomeric material comprises a foam rubber copolymer of neoprene/vinyl/nitrile.

9. A load detection apparatus comprising:
    a load cell having a constrained end portion and a movable end portion;
    a housing having a longitudinal axis with a first end and a second end;
    a pivot disposed through the housing and located in a plane perpendicular to the longitudinal axis of the housing;
    a sensor mount pivotally disposed on the pivot and having a first end and a second end,
        the first end of the sensor mount being disposed in the first end of the housing and movable between a first position and a second position defined by the housing, and
        the second end being configured for attachment to the movable end portion of the load cell; and at least one spring disposed in the second end of the housing for constraining the constrained end portion of the load cell.

10. The load detection apparatus according to claim 9 wherein the pivot transfers away from the load cell forces that are not aligned with a direction in which the load cell operates.

11. The load detection apparatus according to claim 9 wherein the pivot is disposed through and contacts apertures located in the housing and sensor mount.

12. The load detection apparatus according to claim 9 wherein the load cell is a bending beam load cell.

13. The load detection apparatus according to claim 12 wherein the load cell further comprises an aperture having a diameter through which at least a portion of the pivot is disposed, the portion of the pivot disposed in the aperture having an outer diameter smaller than the diameter of the aperture.

14. The load detection apparatus according to claim 12 wherein the pivot is offset from the longitudinal axis of the housing.

15. The load detection apparatus according to claim 12 wherein the pivot intersects the longitudinal axis of the housing.

16. The load detection apparatus according to claim 9 wherein the load cell is a shear beam load cell.

17. The load detection apparatus according to claim 16 wherein the load cell further comprises an aperture having a diameter through which at least a portion of the pivot is disposed, the portion of the pivot disposed in the aperture having an outer diameter smaller than the diameter of the aperture.

18. The load detection apparatus according to claim 16 wherein the pivot is offset from the longitudinal axis of the housing.

19. The load detection apparatus according to claim 16 wherein the pivot intersects the longitudinal axis of the housing.

20. The load detection apparatus according to claim 9 wherein the load detection apparatus further comprises a handle portion of an end effector for a lift assist device.

21. The load detection apparatus according to claim 9 wherein the at least one spring is configured to constrain the constrained end of the load cell within a desired operating range.

22. The load detection apparatus according to claim 9 wherein the at least one spring comprises two springs, one spring being located between a top surface of the load cell and the housing and the other spring being located between a bottom surface of the load cell and the housing.

23. The load detection apparatus according to claim 9 wherein the at least one spring comprises an elastomeric material.

24. The load detection apparatus according to claim 23 wherein the elastomeric material comprises a foam rubber copolymer of neoprene/vinyl/nitrile.

* * * * *